Aug. 11, 1953     E. W. TODD     2,648,369
RUBBER TIRED GAUGE WHEEL
Filed Oct. 7, 1949

INVENTOR
EVERETT W. TODD
BY   A.S.Knob

ATTORNEY

Patented Aug. 11, 1953

2,648,369

UNITED STATES PATENT OFFICE 2,648,369

RUBBER TIRED GAUGE WHEEL

Everett W. Todd, Racine, Wis., assignor to The Massey-Harris Company, Racine, Wis., a company of Maryland Application October 7, 1949, Serial No. 120,184

1 Claim. (Cl. 152—325)

The present invention relates to a gauge wheel used on implements, particularly planters and the like where it is necessary to closely control the depth of the earth engaging means.

The major difficulties with conventional devices of the character is that the soil accumulates on the wheel tread increasing its diameter to even as much as an inch or more and within a short period of time.

The present invention is adapted to prevent the soil from accumulating on the wheel tread. This is accomplished by means of a pressureless rubber tire having a narrow transversely extended air pocket near the tread, the outer periphery of which has a convex shape transversely, whereby the surface of the tread is flattened when in contact with the earth and, whereby when the contact with the earth is removed, this shape is changed in a manner, whereby the dirt will not accumulate and if it starts to accumulate, the bending action of the periphery of the tire tread will break the dirt loose so when the earth engaging means is set at a certain depth, the depth will remain permanent throughout the day.

One of the advantages of applicant's invention is that when the condition of soil is such as will make it impossible to use a standard gauge wheel, my improved gauge wheel will operate indefinitely without accumulation of soil on the tread.

An object of the present invention is to provide a design of wheel and tire, whereby the wheel can be built at low cost and the tire furnished at low cost.

The principal object of the present invention is to provide a pressureless air pocket in the tire having a shape, whereby the movable part of the tire is cushioned on a wide flat projection and the edges of the air space shaped so the movement of the tread will not cause the tire to check or fracture.

Figure 1:
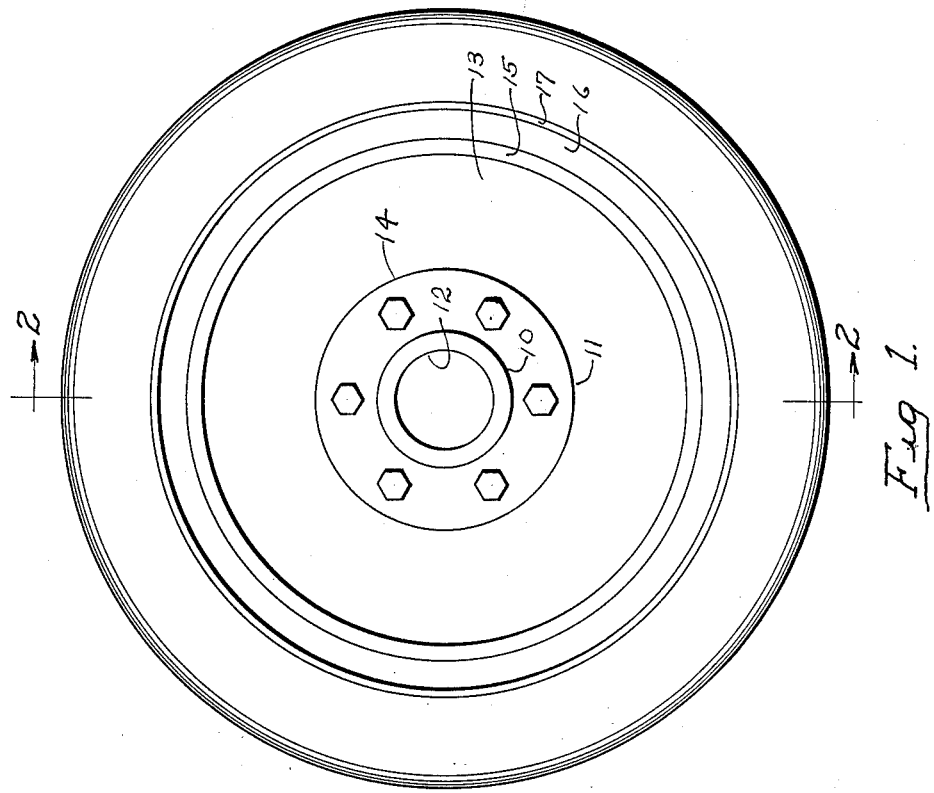

To these and other useful ends, my invention consists of parts, combinations of parts or their equivalents and mode of operation as hereinafter described and claimed and shown in the accompanying drawings in which, Fig. 1 is a side elevational view of a gauge wheel equipped with my improved self cleaning tire.

Figure 2:
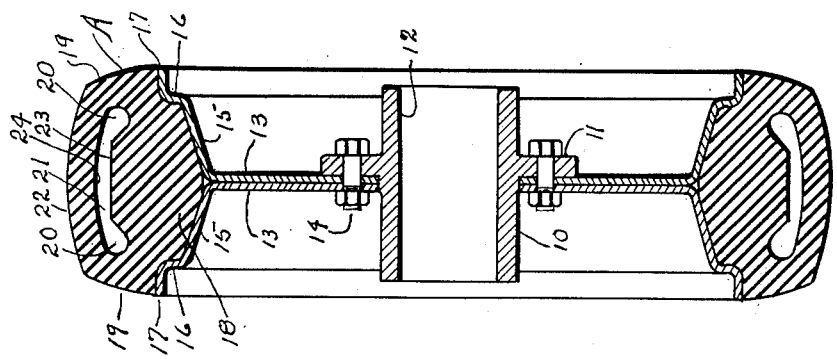

Fig. 2 is a sectional view of the device as shown in Figure 1 and sectioned on line 2—2 of Figure 1.

The wheel of the tire comprises a hub 10 having a flange 11 and an opening 12 in the hub for mounting on a spindle which is attached to the frame of the implement in any conventional manner. The wheel proper of the device is made from two flat steel discs 13—13 which are adapted to be attached to hub 12 by means of a suitable number of bolts 14. The outer periphery of members 13 having a shape somewhat similar when assembled, to a pneumatic tire rim consisting of flanges 15—15, peripherally extending flanges 16—16 and transversely extending flanges 17—17.

I provide a rubber tire designated by reference character A, its base 18 being adapted to snugly fit against surfaces 15, 16 and 17 as shown in Figure 2, member A being made somewhat smaller in diameter than the diameter of members 15 and 17 and slightly wider than the distance between members 16 so when the device is assembled and bolts 14 made taut, the tire will be firmly held in its rim. The design of the gauge wheel being such as will prevent it from becoming loose without the use of cement.

I provide novel means for preventing the accumulation of dirt on the tread surface of the tire as follows. The side walls 19 of the tire preferably converge slightly meeting the tread surface 22 as illustrated in the figures. This tread surface being convex in shape about as illustrated and for a purpose which will hereinafter appear.

I provide a circumferential normally pressureless air pocket 21, its outer surface having a shape about as shown in Figure 2 so that the thickness of the tread 22 is uniform as shown, the side edges of this air pocket 21 comprises circular in cross section enlarged openings 20, terminating at a limit stop 23 which is substantially flat and adapted to limit the depressed movement of member 22 so that when the inner surface 24 of the tread contacts member 23, the outer surface of the tread will be substantially flat; however the contour of pockets 20 will not be greatly distorted. These pockets however, will then be slightly oblonged in shape and members 19 will be slightly further apart than normal, the design being such, as will prevent movement of the rubber adjacent members 17, and the rubber around pockets 20 will not be distorted enough to cause fracturing of the rubber, and the bending action of tread 22 will not be enough to cause injury to the side walls of the tire.

It will be seen however, that the load depression of the tread of the tire will flatten the tread transversely so this periodical movement and the return of the tread to its normal shape will act to break loose any dirt that may accumulate on the surface of the tread.

The primary object of the present invention is to prevent accumulation of dirt on the tread of the tire and to accomplish this without moving the rubber in any spot great enough to cause fracture. This is largely accomplished by the design of the air chamber and especially pockets 20, the shape and thickness of tread 22 and the position of the stop surface 23. The design also is adapted to prevent any movement of the rubber at its contact with members 15, 16 and 17.

It will be understood that slight changes in the design shown may be made without departing from the spirit and scope of the appended claim.

Having thus shown and described my invention, I claim:

In a non inflatable tire having a normal convex tread surface; a transversely elongated air chamber in said tire extending circumferentially thereof and having a radially outer surface substantially similar in shape to said tread surface, side surfaces so spaced to provide a tire side wall thickness greater than the thickness between said tread surface and said outer surface, said side surfaces intersecting said outer surface of the chamber in a smooth curve, and a flat inner surface raised sufficiently above the radially inner ends of the side walls to prevent the tread surface from assuming a concave shape.

EVERETT W. TODD.

References Cited in the file of this patent

UNITED STATES PATENTS

| Number | Name | Date |
|---|---|---|
| 464,767 | Woodward | Dec. 8, 1891 |
| 470,915 | McIntire | Mar. 15, 1892 |
| 1,040,920 | Fiske | Oct. 8, 1912 |
| 1,091,379 | Mussinan | Mar. 24, 1914 |
| 1,122,875 | Doty et al. | Dec. 29, 1914 |
| 1,276,148 | Williams | Aug. 20, 1918 |
| 1,639,175 | Gatial | Aug. 16, 1927 |
| 2,249,637 | Rietz | July 15, 1941 |
| 2,393,161 | Haushalter | Jan. 15, 1946 |
| 2,601,464 | Tanke | June 24, 1952 |